(12) United States Patent
Torres et al.

(10) Patent No.: US 9,508,139 B2
(45) Date of Patent: Nov. 29, 2016

(54) APPARATUS AND METHOD TO AUTOMATICALLY DISTINGUISH BETWEEN CONTAMINATION AND DEGRADATION OF AN ARTICLE

(75) Inventors: Myra A. Torres, Pittsford, NY (US); Abhijit Bhoite, Boise, ID (US); Nikhil Beke, Wheeling, IL (US); Kevin Patrick McCormick, Auburn, NY (US); Timothy Duffy, West Henrietta, NY (US); Jeremy W. Sheaffer, Pittsford, NY (US); Maksim Bobrov, Rochester, NY (US); Michael Moore, Rochester, NY (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 1032 days.

(21) Appl. No.: 13/523,992

(22) Filed: Jun. 15, 2012

(65) Prior Publication Data

US 2012/0320159 A1 Dec. 20, 2012

Related U.S. Application Data

(60) Provisional application No. 61/497,722, filed on Jun. 16, 2011.

(51) Int. Cl.
*G06K 9/00* (2006.01)
*G06T 7/00* (2006.01)

(52) U.S. Cl.
CPC .......... *G06T 7/0006* (2013.01); *G06T 7/0069* (2013.01); *G06T 2207/10148* (2013.01); *G06T 2207/20064* (2013.01); *G06T 2207/20221* (2013.01)

(58) Field of Classification Search
None
See application file for complete search history.

(56) References Cited

U.S. PATENT DOCUMENTS

| 2002/0009218 A1* | 1/2002 | Chapman | G01N 21/88 382/141 |
|---|---|---|---|
| 2011/0019056 A1* | 1/2011 | Hirsch | G06F 3/0325 348/333.01 |
| 2011/0064327 A1* | 3/2011 | Dagher | G06T 5/004 382/263 |

OTHER PUBLICATIONS

MathIsFun (www.mathisfun.com, "Standard Deviation and Variance", Web Archive 2009).*

* cited by examiner

*Primary Examiner* — Mark Roz
(74) *Attorney, Agent, or Firm* — Cantor Colburn LLP

(57) ABSTRACT

An inspection apparatus includes an imaging unit producing image signals; a processing unit for receiving the image signal; the imaging unit producing a stack of images of an article at different focal lengths in response to the processing unit; the processing unit generating a depth map from the stack of images; the processing unit analyzing the depth map to derive a depth profile of an object of interest; the processing unit determining a surface mean for the article from the stack of images; and the processing unit characterizing the article as degraded or contaminated in response to the depth profile and the surface mean.

20 Claims, 7 Drawing Sheets

APPARATUS AND METHOD TO AUTOMATICALLY DISTINGUISH BETWEEN CONTAMINATION AND DEGRADATION OF AN ARTICLE

CROSS-REFERENCE TO RELATED APPLICATIONS

This application claims the benefit of U.S. provisional patent application Ser. No. 61/497,722 filed Jun. 16, 2011, the entire contents of which are incorporated herein by reference.

STATEMENT REGARDING FEDERALLY SPONSORED RESEARCH

This work was funded in part by SBIR N092-118, Phase I Contract (N68335-09-C-0424) and Phase II Contract (N68335-11-C-0192).

BACKGROUND

Embodiments relate generally to automatic inspection and monitoring and more particularly, to automatic inspection and monitoring to distinguish between contamination and degradation of an article.

Currently, interferometers and optical microscopes are widely used for inspecting articles, such as the end-face of a fiber optic connector. The interferometer is an excellent inspection tool for the inspection of a fiber optic connector end-face in the "as built" or "when new" stage of the connector. The interferometer is capable of very precise physical measurement in a non-contact manner using lasers or LED's, coupled with very expensive optics and positioning hardware. An objective lens for interferometric use can cost in the thousands of dollars. Several recently introduced interferometer products also include 2D optical inspection capabilities. Although technology has helped considerably in the size and weight categories, it appears to have had only slight impact, if any, on the price of these units which frequently exceed $15,000.

Fiber optic connector inspection and cleaning are critical for optical signal transmission. In-service conditions of access, cleanliness and physical stability during measurement pose unique issues for bench top fiber optic test equipment. Interferometers are not suitable for in-field measurement or monitoring applications due to the need for vibration stability and cleanliness. An optical microscope based system provides an alternative inspection solution that is more robust and suited to in-service conditions at a cost that is lower than that of an interferometer. Currently, there are video inspection products coupled with a laptop or standalone computer for providing automatic detection of anomalies on the fiber optic connector end-face. However, these video inspection units are not capable of being handheld and thus cannot be readily used in field applications with ease.

SUMMARY

According to one embodiment of the invention, an inspection apparatus includes an imaging unit producing image signals; a processing unit for receiving the image signal; the imaging unit producing a stack of images of an article at different focal lengths in response to the processing unit; the processing unit generating a depth map from the stack of images; the processing unit analyzing the depth map to derive a depth profile of an object of interest; the processing unit determining a surface mean for the article from the stack of images; and the processing unit characterizing the article as degraded or contaminated in response to the depth profile and the surface mean.

According to another embodiment of the invention, a method for inspecting an article includes producing a stack of images of an article at different focal lengths; generating a depth map from the stack of images; analyzing the depth map to derive a depth profile of an object of interest; determining a surface mean for the article from the stack of images; and characterizing the article as degraded or contaminated in response to the depth profile and the surface mean.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

Embodiments relate to a system and method for inspecting articles to distinguish between contamination and degradation of the article. The system uses a variable focus imaging unit to create multiple images at varying focal lengths. The images are combined to provide a depth map which is analyzed to distinguish between contamination and degradation.

Figure 1:
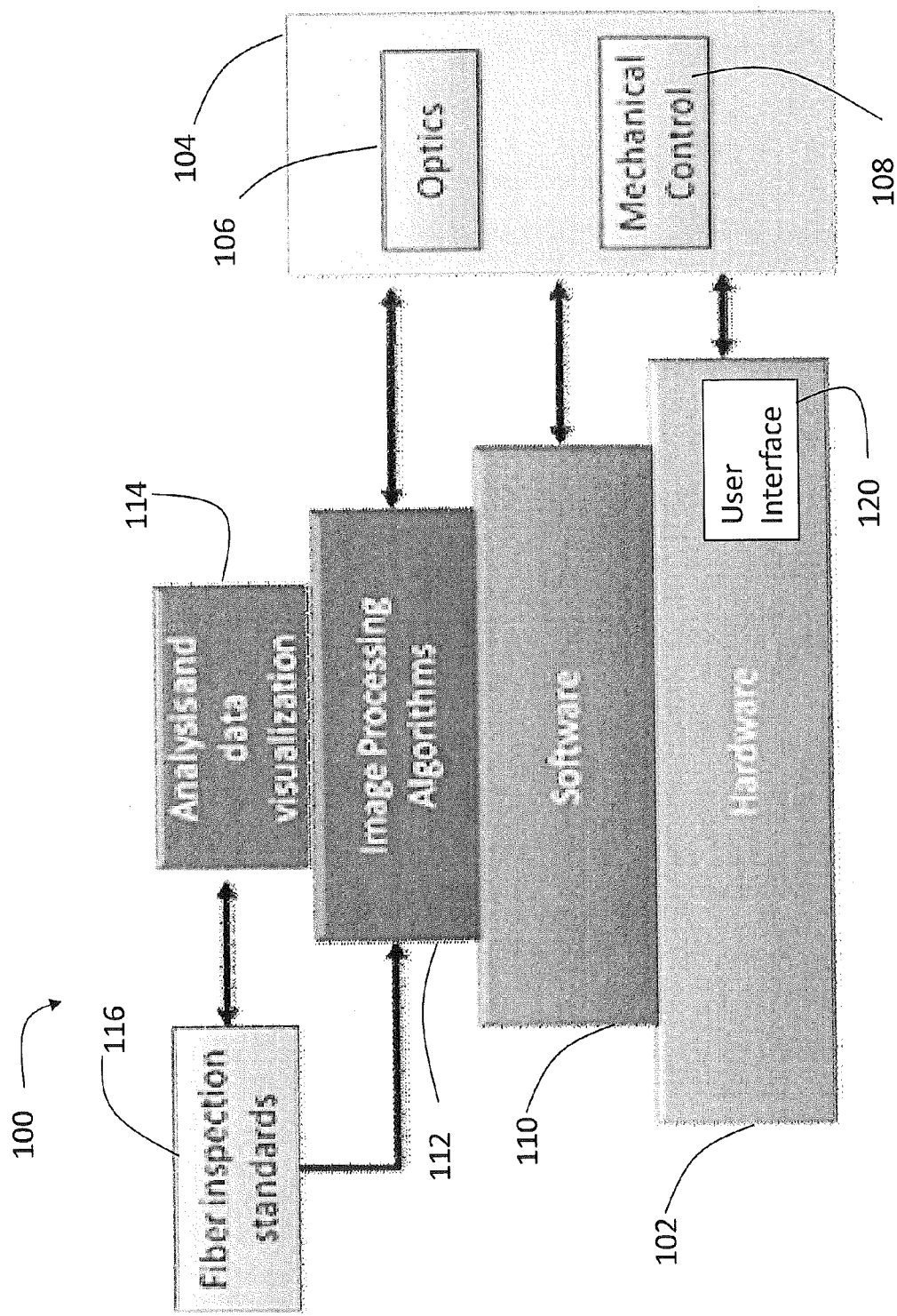
FIG. 1 depicts an architecture for an inspection device in an exemplary embodiment.

FIG. 1 is block diagram of an architecture 100 for an inspection device for inspecting and monitoring (e.g., periodic or continuous monitoring) articles, such as fiber optic connectors. It is to be understood that embodiments of the invention are not limited to inspection of fiber optic connectors and the techniques and apparatus described herein may be applied to various articles. In exemplary embodiments, an automated fiber optic inspection device for military and avionic field applications provides a large field of view and low profile, so as to be able to access an end-face of a fiber optic connector. To reduce operator complexity, this inspection device provides for automated inspection in 2D as well as classifying the depth and height of objects of interest to identify if cleaning is required to remove contamination or if the end-face of the fiber is degraded and needs replacement. The inspection device may be a hand held, portable unit, having the components of FIG. 1.

Architecture 100 includes hardware 102, which may be implemented using known processing devices, such as a microprocessor (e.g., a DSP) or an FPGA. Hardware 102 interfaces with an imaging unit 104. Imaging unit 104 includes optical assembly 106, including a light source, lenses, a detector (e.g., CCD) and other components as described in further detail herein. Mechanical control 108 adjusts the focus of the imaging unit 104 in response to commands from hardware 102 and/or software 110.

Software 110 includes API's for interfacing with the mechanical control 108 and optical assembly 106. Software 110 also hosts algorithms for analyzing images from optical assembly 106 and generating a GUI for displaying the analysis results. For a DSP solution, the software 110 would include a minimalistic operating system for supporting the multimedia libraries and drivers for the display interface, optics interface and mechanical interface.

Optical assembly 106 houses a detector, lenses and a light source for illuminating the article to be inspected. Depending upon the algorithms and lenses (e.g., micro lens arrays or splitters) employed, a single camera or two camera solution can be used. A single CMOS or CCD camera with high spectral resolution. The optical assembly 104 uses autofocus. Autofocus is used to remove subjectivity in fiber optic inspection and increase the accuracy of analysis. The accuracy of the image analysis is dependent on the focus quality of the image acquired. Manual focusing is not only time consuming but also increases the risk of suboptimal focus selection. In avionic applications where the maintainer may have to hold an awkward position just to get to access the article, autofocus is more helpful.

Figure 7:
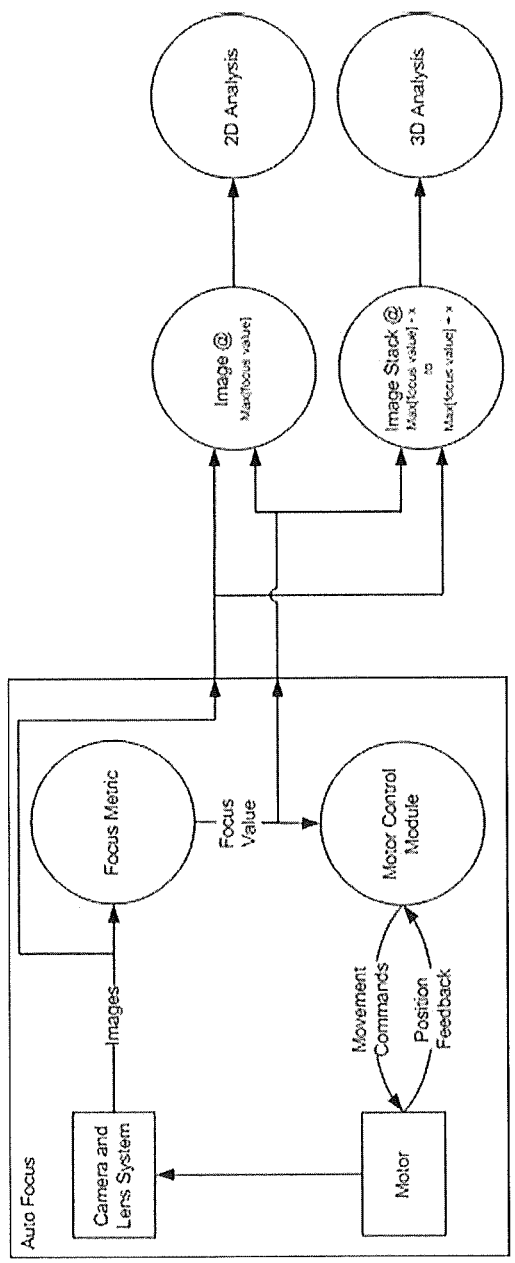
FIG. 7 depicts a motor control unit for image capture in an exemplary embodiment.

An auto focus routine may include sampling an image to determine a mean intensity. After locating the mean intensity, the image is probed for a region of high contrast based on the mean intensity. The contrast gradient of the region is monitored over a series of images. The auto focus is then based on the contrast gradient of the region (e.g., highest contrast gradient is most focused image). Referring to FIG. 7, a motor control module is used to govern the motion of the motor based on focus values obtained from the focus metric (e.g., contrast gradient) as well as position information obtained from the motor. Numerous methods exist for accomplishing this including the proportional-integral-derivative (PID) controller and binary search. The goal of the motor control module is to automatically find the image associated with the lens system position at which the focus metric is maximized. The image is then captured, where the maximum focus metric value image is used for 2D analysis and the maximum range of images is collated in the image stack for 3D analysis (maximum focus value plus or minus x, where x represents a range of focal length steps). Using an automatic focusing approach, instead of manual focusing as has been done traditionally, allows for a systematic and predictable method to finding the region of greatest focus.

There are many different metrics that can be used to determine the level of focus an image has. One method for electronic imaging uses an exhaustive search using the gradient difference method. This method provides, by far, the most accurate level of focus, specifically for non-moving targets. There are other methods such as looking at image energy content as well as using multi-camera solutions to calculate focus without using an exhaustive approach. Template matching of acquired images with previously stored focused image is also a potential, but a computationally inefficient solution.

Image processing algorithms 112 are used to process the acquired images from optical assembly 104. The image processing algorithms 112 can select a series of images across the entire, or partial focal range for the 2D analysis and generate a depth map for 3D analysis, as described in further detail herein. Image filtering, alignment, enhancement, etc., may be performed by image processing algorithms 112. Depending on the quality of the image, contrast enhancement can also be done at this stage for improving classification accuracy.

Image classification is performed by image processing algorithms 112 to provide fast, accurate object detection. Contrast variation can be used as a feature for separating the foreground (e.g., fiber cladding and contaminants) from background (e.g., a ferrule). Edge detection algorithms such as Canny filters and Sobel filters can be used as well. This further can be followed by circle detection algorithms to distinguish cladding from the contaminants. Another approach is to use learning algorithms such as SIFT or a sliding window object detector (template matching).

Image processing algorithms 112 also perform depth mapping. The end-face of the fiber optic connector is illuminated in a direction orthogonal to the end-face. Due to this, any degradation of the end-face is represented as a black spot, similar to contamination. Thus, the operator is not able to distinguish between contamination (e.g., dirt) that can be cleaned and degradation (e.g., scratches, pits, protrusions) that require replacement. In existing systems, the operator assumes degradation and discards the end-face if it is dirty after cleaning three times.

Embodiments use a depth map to classify an article as damaged or undamaged. The depth map can be produced from single camera using a technique used in light microscopy. In this methodology, a depth map is generated by fusing multiple images, at the same angle and illumination but at different focal lengths. Regions of maximum focus are selected from each image. The focal length used to obtain the image gives the height of the in-focus region.

Analysis and data visualization module 114 uses the images from image processing algorithms 112 to determine if the article is dirty or clean (i.e., contaminated) and whether the article is damaged or undamaged (i.e., degraded). The analysis and data visualization module 114 measures features from the 2D image and the depth map, and compares these features to standards 116. The standards 116 may be loaded into the inspection device remotely (e.g., via software update) so that the inspection device is configurable for inspection of a myriad of articles. In the example of optical fiber inspection, standards 116 may represent DoD aircraft criterion and/or iNemi communication criterion for contamination. These standards may specify acceptable levels for size and/or number of contaminants for various locations (e.g., core, cladding, threat zone) on an optical fiber connector end-face.

The inspection results are displayed to the user in a simple and intuitive manner through a user interface 120. User interface 120 may include an LCD screen attached to the inspection device. This display may also serve as a means to control the inspection device via touch interface. This simple user interface may be used to enter information about the article to be inspected, if specific parameters are needed to maximize the success rate of the inspection process, as well as control the device as needed.

Figure 2:
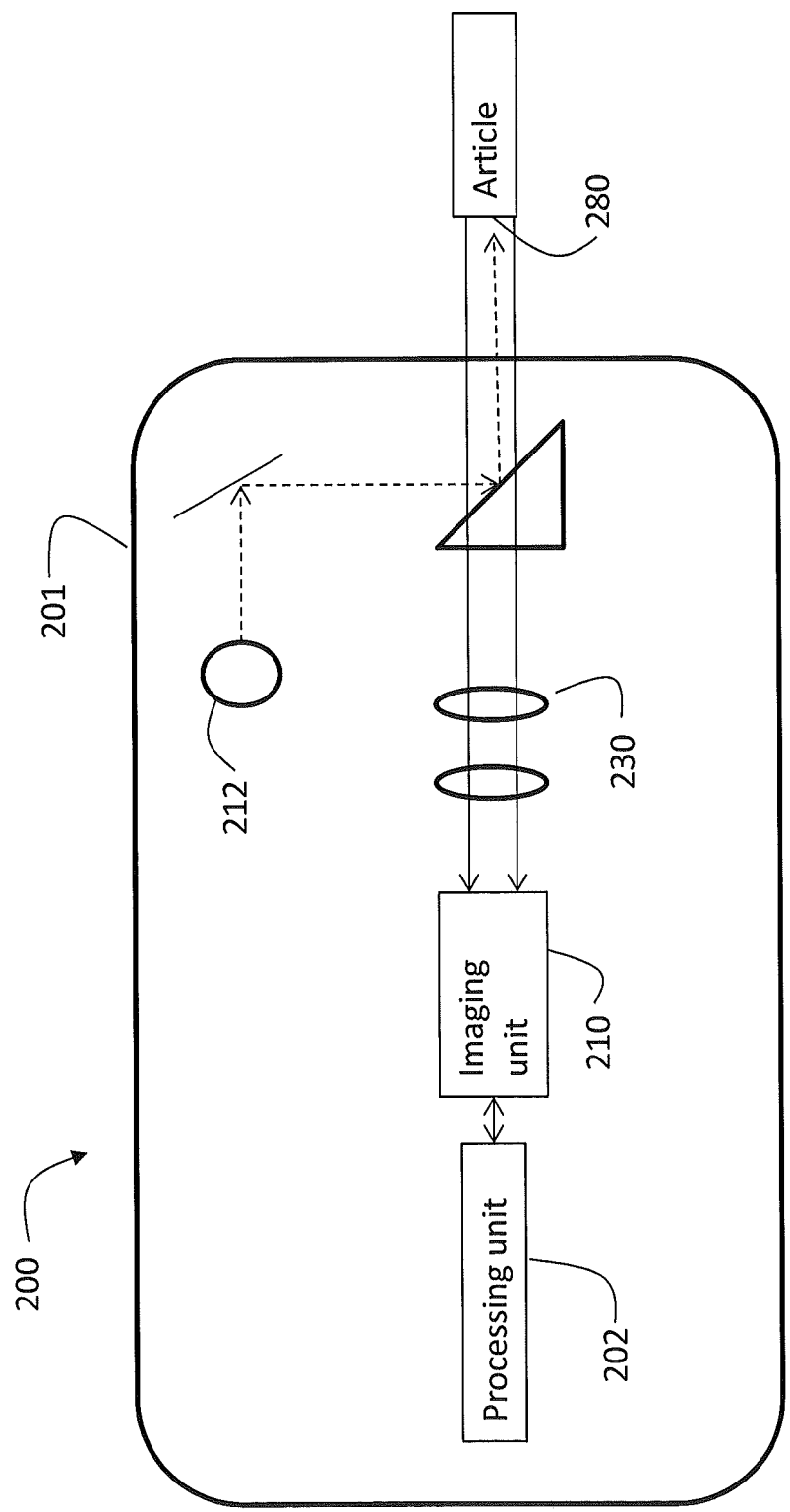
FIG. 2 is a block diagram of an inspection device in an exemplary embodiment.

FIG. 2 depicts an exemplary inspection device 200. Inspection device 200 is contained in a housing 201, and is a portable, hand held device. A single stationary camera or imaging unit 210 performs optical sectioning to produce images at various focus lengths of a surface 280 of an article using a fixed depth of field (e.g., end-face of a fiber optic connector). The generation of a depth map is done orthogonal to surface 280, and is used to determine if a depth profile of an object of interest is above a surface mean or below the mean. If the depth profile of an object of interest is above the mean, the end-face 280 may be contaminated or degraded, depending on secondary factors. If the depth profile of an object of interest is below the mean, the end face has been degraded (e.g., scratched). As further disclosed herein, a depth map is generated with interpolation between images at varying focal lengths, in order to accurately characterize the relative depth profile of the objects of interest.

An automated, adjustable lens system 230 allows for precise optical sectioning at varying focal lengths in response to the processing unit 202. A light source 212 illuminates the article to be inspected. Optical sectioning is used to generate multiple images in order to apply a 3D modeling algorithm. Once the position within the lens movement range is found, optical sectioning has a known location from which to determine lens offsets. The system, under programmatic control of a processing unit 202, moves the lens system to points of focus slightly off from the previous most focused point. This ensures that the entire possible range of focused portions of the surface 280 will be, at one point, in focus. The system has the ability to section any sub-range of the total focal length. Alternatively, the imaging unit 210 can be moved (rather than adjusting the lens system) to achieve the various focal lengths.

The depth of field determines the number of images that need to be taken transitionally. In one embodiment, the number of images was based on depth of field, processing time, and empirical measurements. A number of images were taken using the exemplary method disclosed: one image focused on surface 280, plural images with successively shorter focal lengths and plural images with successively longer focal lengths. The optimal focal length provides the most focused image of the surface 280 of the article. The shorter and longer focal lengths used to generate the additional images are relative to the focal length that provides the surface mean, i.e., the surface 280 of the article.

Figure 3:
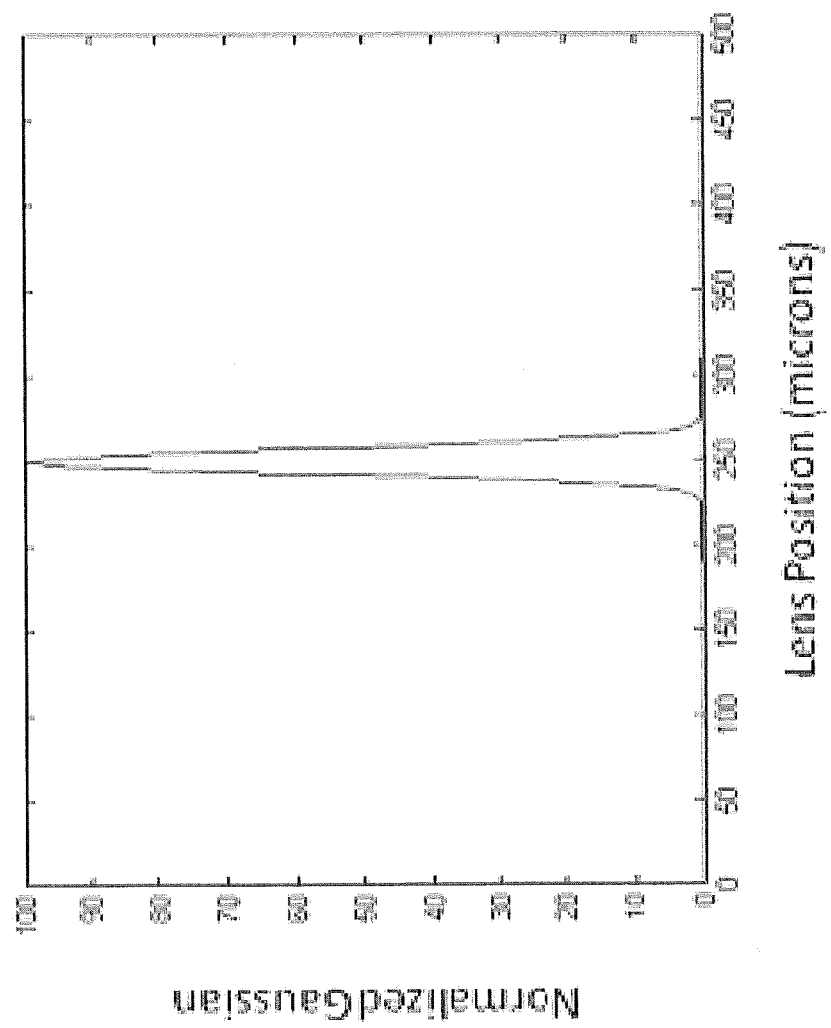
FIG. 3 illustrates adjustments to lens position in an exemplary embodiment.

An algorithm operating on processing unit 202 keeps some portion of the image in focus at all times to maximize the efficiency of the 3D model generation. With this said, the algorithm does not actively determine if there is a portion of the image that is in focus, it simply stays within a calculated range on either side of the previously calculated most focused image. This can be seen in FIG. 3 as the top most portion of the focused area. The previously calculated most focused image can be detected by determining an image having the highest contrast between dark and light regions. Once the focal length of the most focused image is determined, a number of images on either side of this focal length are acquired.

Continuing with this example, the images generated from previously calculated offsets are submitted to a 3D depth map generation algorithm. Upon completion, the lens system 230 is moved back to the previously calculated most focused point for visual clarity to ensure the operator could use the image to empirically determine the level of focus if needed or desired.

Figure 4:
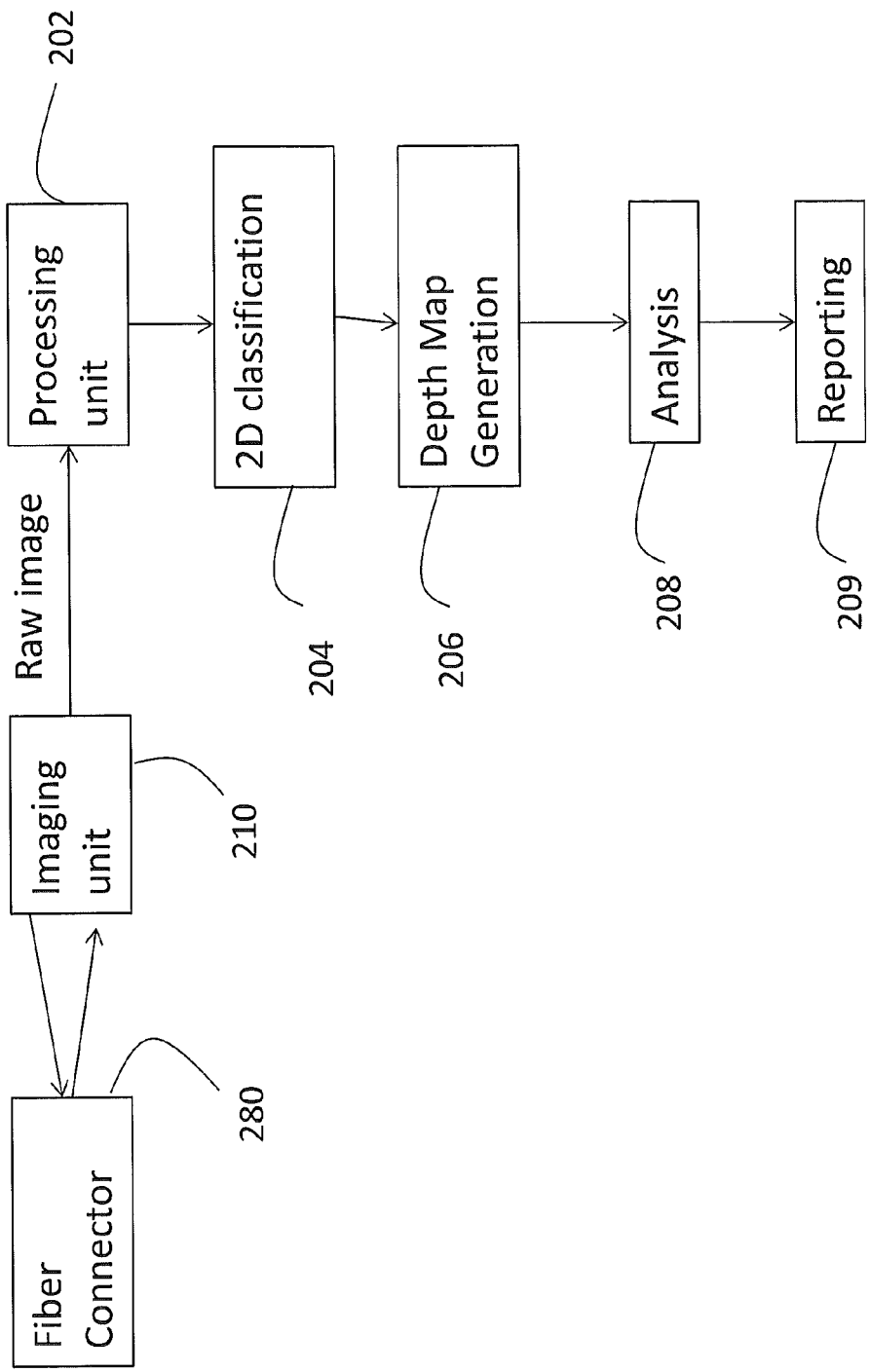
FIG. 4 is high level flow diagram of processing performed by the inspection device in an exemplary embodiment.

FIG. 4 is high level flow diagram of processing performed by the system of FIG. 2. As shown in FIG. 4, an article, such as an end face 280 of a fiber optic connector, is imaged by imaging unit 210. The raw image is provided processing unit 202 to perform 2D classification 204 and depth map generation 206. Image analysis is performed at 208 and the results reported at 209 through, for example, user interface 120.

Figure 5:
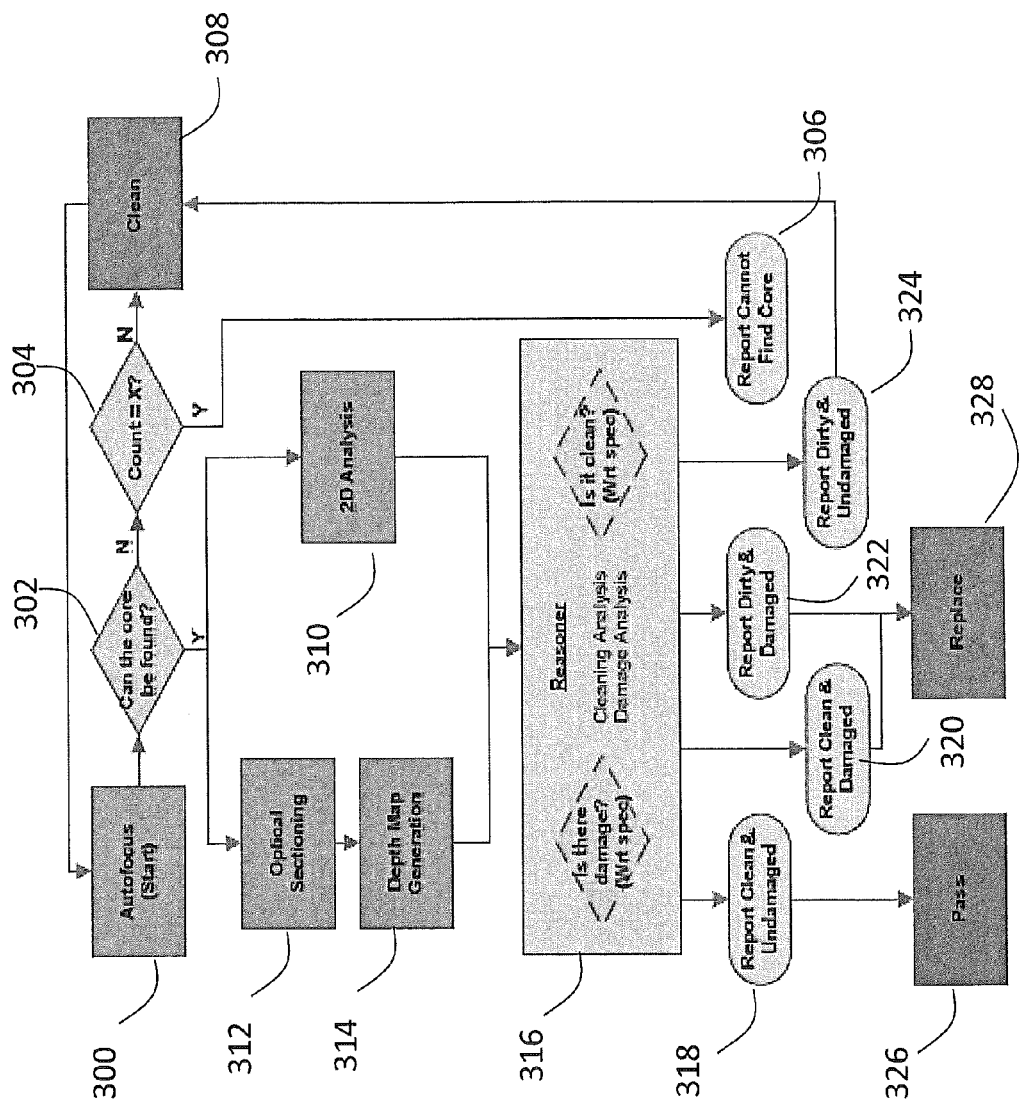
FIG. 5 is a flowchart of a process for inspecting an article in an exemplary embodiment.

FIG. 5 depicts a flowchart of processing performed by the system of FIG. 2. The process beings at 300 where autofocus routine is launched to adjust the focal length of imaging unit 202. In the example of FIG. 5, the article inspected is a fiber optic connector end-face. At 302 it is determined if the core of the optical fiber can be located. It is understood that embodiments are not limited to optical fiber inspection, and step 302 may involve locating some other feature of interest (e.g., a rivet head). If the core is not located in the image, at 304 it is determined if a count exceeds a threshold. If so, the system reports that the core cannot be located at 306. If the count is not exceeded at 304, flow proceeds to 308 where the fiber is cleaned by the operator and the process loops back to 300.

If at 302 the core is found, flow proceeds to 310 where a 2D image is analyzed. The selected 2D image may be the image having the highest contrast between dark and light regions; the image having the best focus. Objects of interest in the 2D image are located and compared to the standards 116 by processing unit 202. Objects of interest may be identified as groups of pixels having an intensity above a threshold and a size above a threshold. As noted above, the standards may apply limits on the number and/or size of contamination in certain regions of the article. If any objects of interest fail to meet the standards, then the article may be considered contaminated.

At 312, optical sectioning is performed to create multiple images at varying focal lengths. As noted above, images may be acquired at the in-focus focal length, at a larger focal length and at a smaller focal length. For example, one image may be acquired at the in-focus focal length, three images and successively longer focal lengths and four images at successively smaller focal lengths. This imaging creates a stack of images at varying focal lengths.

At 314, a depth map is generated from the stack of images. The depth map is generated using transforms described herein with reference to FIG. 6. The depth map provides a depth profile of objects of interest relative to a surface 280 of the article being inspected, referred to as the surface mean. Objects of interest in the depth map may be identified as groups of voxels having an intensity above a threshold and a size above a threshold.

At 316, processing unit 202 determines the condition of the article based on the 2D image and the depth map. Objects of interest in the 2D image are located, counted and measured to determine if the objects of interest fail to meet the standards 116. If the objects of interest in the 2D image fail to meet the standards 116, then the article is considered contaminated, referred to in FIG. 5 as dirty.

Also at 316, the depth map is analyzed to determine if the article conforms to standards 116. The depth map may indicate objects of interest above and below the surface mean (i.e., the surface 280 of the article). As such, the depth map can indicate if the article is degraded to an extent that cleaning will not improve the condition of the article. For example, the depth map may indicate a scratch on an optical fiber, the scratch having a depth profile that exceeds a limit in the standard. In this scenario, the article is considered damaged or degraded. Damage to an article can also exist above the surface mean, such as a protrusion of corrosion, calcification, oxidation, etc., above the surface mean of the article. Thus, damage is not limited to objects of interest below the surface mean, but includes objects of interest having depth profiles either above or below the surface mean. The standards 116 may set different depth thresholds for objects of interest below and above the surface mean to be characterized as degradation. Further, degradation above the surface mean may include analyzing secondary parameters of the article and/or images of the article.

The results are classified at 318, 320, 322 and 324. The various conclusions are summarized below in Table 1. Actions include passing the article at 326, replacing the article at 328 or cleaning the article at 308.

TABLE 1

REPORT AND ACTION TABLE

| 2D | Depth Map | Report | Action |
|---|---|---|---|
| Fail | Fail | Dirty & Damaged | Replace |
| Pass | Fail | Clean & Damaged | Replace |
| Fail | Pass | Dirty & Undamaged | Clean |
| Pass | Pass | Clean & Undamaged | Nothing |

Figure 6:
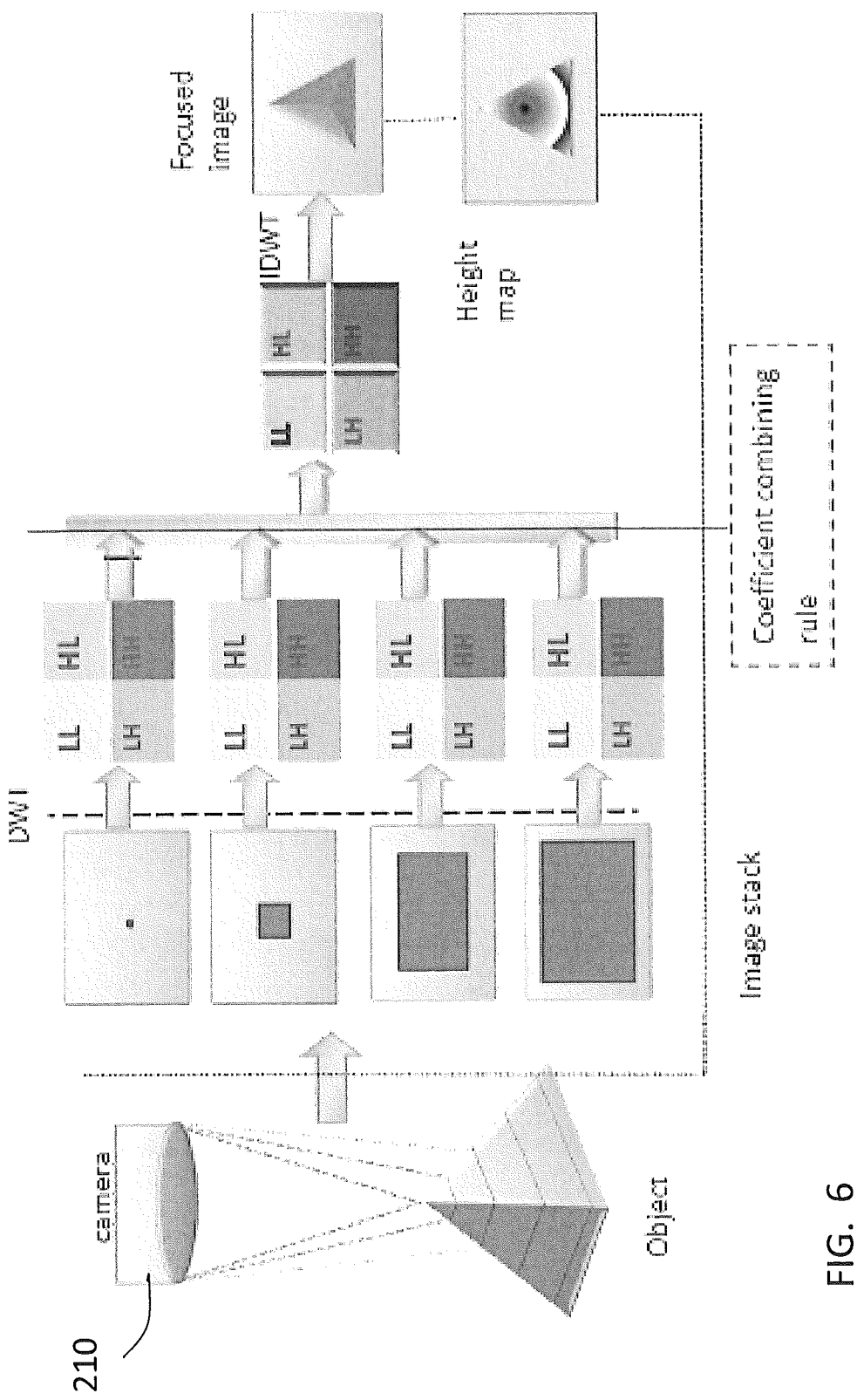
FIG. 6 depicts generation of a depth map in an exemplary embodiment.

FIG. 6 depicts generation of the depth map in more detail. To generate a three dimensional view of any given surface, two sets of information are used. An image of the surface with equally spaced points forms an XY plane. A height map attributes a height to each point in the image, thus forming the Z axis. A height map can be conceived as a grayscale image, where the intensity of each pixel corresponds to a height.

As shown in FIG. 6, imaging unit 210 obtains images of an object (e.g., fiber end-face) at varying focal lengths to generate a stack of images. A spatial frequency domain analysis is performed to identify the in-focus areas in each image. The guiding principle behind this approach is the assumption that in-focus parts contain many details and thus many high frequency components. Classically, frequency analysis is used for extracting high frequency components however, frequency analysis does not provide any spatial localization of the frequency components. In exemplary embodiments, a spatial frequency transform (e.g., discrete wavelet transform) is used to obtain a better analysis of the surface of the article. The spatial frequency transform provides excellent temporal resolution for the high frequency components of the surface, such as dirt particles, scratches, or even small pits.

As seen in FIG. 6, the spatial frequency transform decomposes the images into different coefficients, preserving the image information. The coefficients from each image are combined together to form a single composite set of coefficients. After combining the coefficients, an inverse spatial frequency transform is performed on the combined coefficients to form a fused image. The depth map is then created by using the fused image and the index of the image on the stack. The depth map is analyzed to detect contamination or degradation by comparing a depth profile of an object of interest to standards 116.

Embodiments of the automated inspection device provide many benefits to the operator. The inspection standard for acceptability is controlled through software; the operator does not have to be burdened with understanding the nuances of acceptance criteria and can focus on the field application. Decision ambiguity during inspection is eliminated. Technicians with different skill levels can qualify end-face termination with equivalent repeatability. Characterization and documentation of the end-face image and inspection decision are captured digitally and potentially used for condition based maintenance implementations. Clear visual distinction between contamination and degradation.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An inspection apparatus comprising:
    an imaging unit producing image signals;
    a processing unit for receiving the image signal;
    the imaging unit producing a stack of images of an article at different focal lengths in response to the processing unit;
    the processing unit generating a depth map from the stack of images;
    the processing unit analyzing the depth map to derive a depth profile of an object of interest;
    the processing unit determining a surface mean for the article from the stack of images; and
    the processing unit characterizing the article as degraded or contaminated in response to comparison of the depth profile and the surface mean, wherein:
    if the depth profile is below the surface mean, the article is characterized as degraded, and
    if the depth profile is above the surface mean, the article is characterized as contaminated depending on secondary factors.

2. The inspection apparatus of claim 1, wherein the depth map is generated using interpolation images of the stack of images.

3. The inspection apparatus of claim 1, wherein producing the stack of images of the article at different focal lengths includes acquiring one image focused on a surface of the article, a number of images with successively shorter focal lengths and a number of images with successively longer focal lengths.

4. The inspection apparatus of claim 3, further including performing a spatial frequency analysis to identify the in-focus areas in each image of the stack of images.

5. The inspection apparatus of claim 4, wherein the frequency analysis is performed using spatial frequency transform.

6. The inspection apparatus of claim 5, wherein the spatial frequency transform is performed on each image of the stack of images to provide sets of coefficients, the sets of coefficients being combined to form a composite set of coefficients.

7. The inspection apparatus of claim 6, wherein the composite set of coefficients are subjected to an inverse spatial frequency transform to form a fused image.

8. The inspection apparatus of claim 7, wherein the depth map is generated from the fused image.

9. The inspection apparatus of claim 1 wherein the imaging unit and the processing unit are positioned in a common housing.

10. A method for inspecting an article, the method comprising:
producing a stack of images of an article at different focal lengths;
generating a depth map from the stack of images;
analyzing the depth map to derive a depth profile of an object of interest;
determining a surface mean for the article from the stack of images; and
characterizing the article as degraded or contaminated in response to comparison of the depth profile and the surface mean, wherein:
if the depth profile is below the surface mean, the article is characterized as degraded, and
if the depth profile is above the surface mean, the article is characterized as contaminated depending on secondary factors.

11. The method of claim 10, wherein the depth map is generated using interpolation images of the stack of images.

12. The method of claim 10, wherein producing the stack of images of the article at different focal lengths includes acquiring one image focused on a surface of the article, a number of images with successively shorter focal lengths and a number of images with successively longer focal lengths.

13. The method of claim 12, further including performing a spatial frequency analysis to identify the in-focus areas in each image of the stack of images.

14. The method of claim 13, wherein the frequency analysis is performed using spatial frequency transform.

15. The method of claim 14, wherein the spatial frequency transform is performed on each image of the stack of images to provide sets of coefficients, the sets of coefficients being combined to form a composite set of coefficients.

16. The method of claim 15, wherein the composite set of coefficients are subjected to an inverse spatial frequency transform to form a fused image.

17. The method of claim 16, wherein the depth map is generated from the fused image.

18. The method of claim 10, wherein:
producing the stack of images includes executing an auto focus routine including sampling an image to determine a mean intensity, probing the image for a region of high contrast based on the mean intensity and monitoring a contrast gradient of the region over a series of images.

19. The method of claim 10, wherein:
producing the stack of images includes executing an auto focus routine including deriving a focus metric for each of a plurality of images and selecting an image with a maximum focus metric for two dimensional analysis.

20. The method of claim 19, wherein:
producing the stack of images includes obtaining motor position information from a motor adjusting focal length, and using the focus metric and motor position to generate the stack of images.

* * * * *